US011486017B2

(12) United States Patent
Soler et al.

(10) Patent No.: US 11,486,017 B2
(45) Date of Patent: *Nov. 1, 2022

(54) COLD ROLLED AND ANNEALED STEEL SHEET, METHOD OF PRODUCTION THEREOF AND USE OF SUCH STEEL TO PRODUCE VEHICLE PARTS

(71) Applicant: ARCELORMITTAL, Luxembourg (LU)

(72) Inventors: Michel Soler, Maizières-les-Metz (FR); Ian Alberto Zuazo Rodriguez, Metz (FR); Irène De Diego Calderon, Metz (FR)

(73) Assignee: ArcelorMittal, Luxembourg (LU)

( * ) Notice: Subject to any disclaimer, the term of this patent is extended or adjusted under 35 U.S.C. 154(b) by 410 days.

This patent is subject to a terminal disclaimer.

(21) Appl. No.: 16/302,977

(22) PCT Filed: May 23, 2017

(86) PCT No.: PCT/IB2017/000616
§ 371 (c)(1),
(2) Date: Nov. 19, 2018

(87) PCT Pub. No.: WO2017/203346
PCT Pub. Date: Nov. 30, 2017

(65) Prior Publication Data
US 2019/0276909 A1    Sep. 12, 2019

(30) Foreign Application Priority Data

May 24, 2016 (WO) .................. PCT/IB2016/000701

(51) Int. Cl.
*C21D 9/46* (2006.01)
*C21D 1/26* (2006.01)
(Continued)

(52) U.S. Cl.
CPC .................. *C21D 9/46* (2013.01); *C21D 1/26* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 4,067,754 A    1/1978 Elias et al.
6,336,349 B1   1/2002 Hauger et al.
(Continued)

FOREIGN PATENT DOCUMENTS

CN    101490298    7/2009
CN    103370434    10/2013
(Continued)

OTHER PUBLICATIONS

Bartlett et al., "Effect of Phosphorus and Silicon on the Precipitation of κ-carbides in Fe-30%Mn-9%Al-X%Si-0.9%C-0.5%Mo Alloys" (2010), AFS Transactions 2010, American Foundry Society, p. 1-12, (Year: 2010).*

(Continued)

*Primary Examiner* — Brian D Walck
*Assistant Examiner* — Christopher D. Moody
(74) *Attorney, Agent, or Firm* — Davidson, Davidson & Kappel, LLC

(57) ABSTRACT

A cold rolled and annealed steel sheet includes by weight: 0.6<C<1.3%, 15.0<Mn<35%, 6.0<Al<15%, Si<2.40%, S<0.015%, P<0.1%, N<0.1%, iron and inevitable impurities, optionally one or more of Ni, Cr and Cu in an individual amount of up to 3% and optionally one or more of B, Ta, Zr, Nb, V, Ti, Mo, and W in a cumulated amount of up to 2.0%, a microstructure of the sheet comprising at least 0.1% of (Continued)

intragranular kappa carbides, at least 80% of the kappa carbides have an average size below 30 nm, the remainder being made of austenite, an average grain size of the austenite being below 6 μm, an average aspect ratio of the austenite being between 1.5 and 6, an average grain size of the ferrite, when present being below 5 μm, and an average aspect ratio of the ferrite, when present, being below 3.0.

25 Claims, 1 Drawing Sheet

(51) Int. Cl.
| | |
|---|---|
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |

(52) U.S. Cl.
CPC ......... *C21D 8/0205* (2013.01); *C21D 8/0226* (2013.01); *C21D 8/0236* (2013.01); *C21D 8/0263* (2013.01); *C21D 8/0268* (2013.01); *C21D 8/0284* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C21D 2211/001* (2013.01); *C21D 2211/004* (2013.01); *C21D 2211/005* (2013.01); *C21D 2211/008* (2013.01)

(56) References Cited

U.S. PATENT DOCUMENTS

| | | | |
|---|---|---|---|
| 7,794,552 B2 | 9/2010 | Cugy et al. | |
| 9,738,958 B2 | 8/2017 | Chin et al. | |
| 2003/0145911 A1 | 8/2003 | Hoffmann et al. | |
| 2006/0033347 A1 | 2/2006 | Hauger et al. | |
| 2006/0179638 A1 | 8/2006 | Engl et al. | |
| 2006/0278309 A1 | 12/2006 | Bouzekri et al. | |
| 2008/0083477 A1 | 4/2008 | Drillet et al. | |
| 2008/0271823 A1 | 11/2008 | Hofmann et al. | |
| 2009/0010793 A1* | 1/2009 | Becker .................. | C21D 6/005 420/38 |
| 2009/0053556 A1 | 2/2009 | Sohn et al. | |
| 2009/0165897 A1 | 7/2009 | McEwan | |
| 2010/0037993 A1 | 2/2010 | Kim et al. | |
| 2011/0308673 A1 | 12/2011 | Schneider et al. | |
| 2013/0081740 A1 | 4/2013 | Liu | |
| 2013/0118647 A1 | 5/2013 | Berkhout et al. | |
| 2013/0209831 A1 | 8/2013 | Becker et al. | |
| 2013/0209833 A1 | 8/2013 | Scott et al. | |
| 2014/0007922 A1 | 1/2014 | Li et al. | |
| 2014/0134450 A1 | 5/2014 | Eberlein et al. | |
| 2014/0251505 A1 | 9/2014 | Blumenau et al. | |
| 2015/0147221 A1* | 5/2015 | Perlade ................. | B21B 1/463 420/75 |
| 2015/0147589 A1 | 5/2015 | Bouaziz et al. | |
| 2015/0152533 A1 | 6/2015 | Bongards et al. | |
| 2015/0211088 A1 | 7/2015 | Kim et al. | |
| 2016/0010173 A1 | 1/2016 | Scott et al. | |
| 2016/0138146 A1 | 5/2016 | Braun et al. | |
| 2016/0186285 A1 | 6/2016 | Kim et al. | |
| 2016/0319388 A1 | 11/2016 | Kim et al. | |
| 2019/0055622 A1* | 2/2019 | Chen .................... | C21D 8/0226 |

FOREIGN PATENT DOCUMENTS

| | | |
|---|---|---|
| CN | 103820735 A | 5/2014 |
| EP | 1878811 A1 | 1/2008 |
| EP | 2048256 A1 | 4/2009 |
| EP | 2208803 A1 | 7/2010 |
| EP | 3088548 A1 | 11/2016 |
| JP | 2001079607 A | 3/2001 |
| JP | 2005120399 A | 5/2005 |
| JP | 2006044651 A | 2/2006 |
| JP | 2006118000 A | 5/2006 |
| JP | 2006176843 A | 7/2006 |
| JP | 2008520830 A | 6/2008 |
| JP | 2014177662 A | 9/2014 |
| KR | 20090020278 A | 2/2009 |
| KR | 20140013333 A | 2/2014 |
| RU | 2401877 C2 | 10/2010 |
| RU | 2524027 | 7/2014 |
| RU | 2554265 C2 | 6/2015 |
| RU | 2563066 C2 | 9/2015 |
| WO | 2009084792 A1 | 7/2009 |
| WO | 2009084793 A1 | 7/2009 |
| WO | 2015099221 A1 | 7/2015 |

OTHER PUBLICATIONS

Bartlett et al., "An Atom Probe Study of Kappa Carbide Precipitation and the Effect of Silicon Addition", (2014), Metallurgical and Materials Transactions A, vol. 45A, p. 2421-2435, DOI: 10.1007/s11661-014-2187-3 (Year: 2014).*

Rana et al., "Overview of Lightweight Ferrous Materials: Strategies and Promises", (2014), JOM, vol. 66, No. 9, p. 1734-1746, DOI: DOI: 10.1007/s11837-014-1126-5 (Year: 2014).*

Wolfgang Bleck et al., "New Methods in Steel Design," Metec 2015, Jun. 19, 2015.

Auriane E., et al., "Ferrite Effects in Fe—Mn—Al—C Triplex Steels", Metallurgical and Materials Transactions A: Physical Metallurgy & Materials Science, 45/1, pp. 324-334, Sep. 17, 2013 (Sep. 17, 2013).

Frommeyer Georg, Outside One person and Microstructures and Mechanical Properties of High-Strength Fe—Mn—Al—CLight-Weight TRIPLEX Steels, Steel Research International, Germany, Sep. 2006, and vol. 77 No. 9/10, p. 627-633.

* cited by examiner

COLD ROLLED AND ANNEALED STEEL SHEET, METHOD OF PRODUCTION THEREOF AND USE OF SUCH STEEL TO PRODUCE VEHICLE PARTS

FIELD OF THE INVENTION

The present invention deals with a low density steel sheet presenting a microstructure mainly comprising austenite. The steel sheet according to the invention is particularly well suited for the manufacture of safety or structural parts for vehicles such as land motor vehicles.

BACKGROUND

Environmental restrictions are forcing automakers to continuously reduce the CO2 emissions of their vehicles. To do that, automakers have several options, whereby their principal options are to reduce the weight of the vehicles or to improve the efficiency of their engine systems. Advances are frequently achieved by a combination of the two approaches. This invention relates to the first option, namely the reduction of the weight of the motor vehicles. In this very specific field, there is a two-track alternative:

The first track consists of reducing the thicknesses of the steels while increasing their levels of mechanical strength. Unfortunately, this solution has its limits on account of a prohibitive decrease in the rigidity of certain automotive parts and the appearance of acoustical problems that create uncomfortable conditions for the passenger, not to mention the unavoidable loss of ductility associated with the increase in mechanical strength.

The second track consists of reducing the density of the steels by alloying them with other, lighter metals. Among these alloys, the low-density ones have attractive mechanical and physical properties while making it possible to significantly reduce the weight.

In particular, US 2003/0145911 discloses a Fe—Al—Mn—Si light steel having good formability and high strength. However, the ultimate tensile strength of such steels does not go beyond 800 MPa which does not allow taking full advantage of their low density for parts of all kinds of geometry.

SUMMARY OF THE INVENTION

A purpose of the invention therefore is to provide a steel sheet presenting a density below 7.2, an ultimate tensile strength of at least 1000 MPa and a yield strength of at least 900 MPa.

In a preferred embodiment, the steel sheet according to the invention presents a density equal or below 7.1 or equal or below 7.0, an ultimate tensile strength of at least 1100 MPa and a yield strength of at least 1000 MPa.

This object is achieved by providing a cold rolled and annealed steel sheet comprising by weight: 0.6<C<1.3%, 15.0≤Mn<35%, 6.0≤Al<15%, Si≤2.40%, S≤0.015%, P≤0.1%, N≤0.1%, optionally one or more elements chosen among Ni, Cr and Cu in an individual amount of up to 3% and optionally one or more elements chosen among B, Ta, Zr, Nb, V, Ti, Mo, and W in a cumulated amount of up to 2.0%, the remainder of the composition making up of iron and inevitable impurities resulting from elaboration, a microstructure of said sheet comprising at least 0.1% of intragranular kappa carbides, wherein at least 80% of said kappa carbides have an average size below 30 nm, optionally up to 10% of granular ferrite, the remainder being made of austenite, an average grain size of the austenite being below 6 μm, an average aspect ratio of the austenite being between 1.5 and 6, an average grain size of the ferrite, when present being below 5 μm, and an average aspect ratio of the ferrite, when present, being below 3.0.

Other characteristics and advantages of the invention will become apparent from the following detailed description of the invention.

DETAILED DESCRIPTION

Figure 1A:
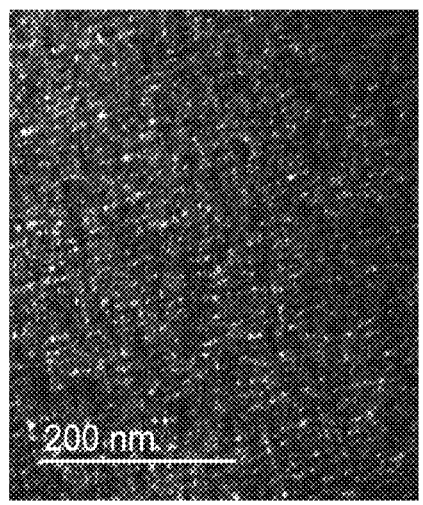
FIGS. 1 (a) and 1 (b) reproduce a dark field image of kappa carbites in a sample from trial 2 and corresponding diffraction pattern, zone axis [110] kappa. Arrow indicated the reflection used for the dark field image in FIG. 1 (a)

Without willing to be bound by any theory it seems that the low density steel sheet according to the invention allows for an improvement of the mechanical properties thanks to this specific microstructure.

Regarding the chemical composition of the steel, carbon plays an important role in the formation of the microstructure and reaching of the targeted mechanical properties. Its main role is to stabilize austenite which is the main phase of the microstructure of the steel as well as to provide strengthening. Carbon content below 0.6% will decrease the proportion of austenite, which leads to the decrease of both ductility and strength of the alloy. As a main constituent element of the intragranular kappa carbide $(Fe,Mn)_3AlC_x$, carbon promotes the precipitation of such carbides. However, a carbon content above 1.3% can promote the precipitation of such carbides in a coarse manner on the grain boundaries, what results in the decrease of the ductility of the alloy.

Preferably, the carbon content is between 0.80 and 1.3%, more preferably between 0.8 and 1.0% by weight so as to obtain sufficient strength.

Manganese is an important alloying element in this system, mainly due to the fact that alloying with very high amounts of manganese and carbon stabilizes the austenite down to room temperature, which can then tolerate high amounts of aluminium without being destabilized and transformed into ferrite or martensite. To enable the alloy to have a superior ductility, the manganese content has to be equal or higher to 15%. However, when the manganese content is over 35%, the precipitation of β-Mn phase will deteriorate the ductility of the alloy. Therefore, the manganese content should be controlled to be equal or greater than 15.0%, but lower than equal to 35%. In a preferred embodiment, it is equal or greater than 15.5% or even than 16.0%. Its amount is more preferably between 18 and 30% and even between 18 and 25%.

Aluminium addition to high manganese austenitic steels effectively decreases the density of the alloy. In addition, it considerably increases the stacking fault energy (SFE) of the austenite, leading in turn to a change in the strain hardening behavior of the alloy. Aluminium is also one of the primary elements of nanosized kappa carbide $(Fe,Mn)_3AlC_x$ and therefore its addition significantly enhances the formation of such carbides. The aluminium concentration of the present alloys should be adjusted, on one hand, to guarantee the austenite stability and the precipitation of kappa carbides, and on the other to control the formation of ferrite. Therefore, the aluminium content should be controlled to be equal or greater than 6.0%, but lower than equal to 15%. In a preferred embodiment, aluminium content is between 7 and 12% and preferably between 8 and 10%.

Silicon is a common alloying element for high manganese and aluminium steels. It has a very strong effect on the formation of ordered ferrite with a $DO_3$ structure. Besides, silicon was shown to enhance the activity of carbon in austenite and to increase the partitioning of carbon into the kappa carbides. In addition, silicon has been described as an effective alloying element that can be used to delay or prevent the precipitation of brittle β-Mn phase. However, above a content of 2.40%, it reduces the elongation and tends to form undesirable oxides during certain assembly processes, and it must therefore be kept below this limit. Preferably, the content of silicon is below 2.0% and advantageously below 1.0.

Sulfur and phosphorus are impurities that embrittle the grain boundaries. Their respective contents must not exceed 0.03 and 0.1% so as to maintain sufficient hot ductility.

Nitrogen content must be 0.1% or less so as to prevent the precipitation of AlN and the formation of volume defects (blisters) during solidification.

Nickel has a positive effect on penetration of hydrogen into the steel and, therefore it can be used as a diffusion barrier to hydrogen. Nickel can also be used as an effective alloying element because it promotes the formation of ordered compounds in ferrite, such as the B2 component, leading to additional strengthening. However, it is desirable, among others for cost reasons, to limit the nickel addition to a maximum content of 4.0% or less and preferably between 0.1 and 2.0% or between 0.1 and 1.0% In another embodiment, the nickel amount is below 0.1%.

Chromium may be used as optional element for increasing the strength of the steel by solution hardening. It also enhances the high temperature corrosion resistance of the steels according to the invention. However, since chromium reduces the stacking fault energy, its content must not exceed 3.0% and preferably between 0.1% and 2.0% or between 0.1 and 1.0%. In another embodiment, the chromium amount is below 0.1%.

Likewise, optionally, an addition of copper with a content not exceeding 3.0% is one means of hardening the steel by precipitation of copper-rich precipitates. However, above this content, copper is responsible for the appearance of surface defects in hot-rolled sheet. Preferably, the amount of copper is between 0.1 and 2.0% or between 0.1 and 1.0%. In another embodiment, the chromium amount is below 0.1%.

Boron has a very low solid solubility and a strong tendency to segregate at the grain boundaries, interacting strongly with lattice imperfections. Therefore, boron can be used to limit the precipitation of intergranular kappa carbides. Preferably, the amount of boron is below 0.1%.

Niobium can simultaneously increase strength and toughness in the steel since it is an effective grain refiner. In addition, tantalum, zirconium, vanadium, titanium, molybdenum and tungsten are also elements that may optionally be used to achieve hardening and strengthening by precipitation of nitrides, carbo-nitrides or carbides. However, when their cumulated amount is above 2.0%, preferably above 1.0%, there is a risk that an excessive precipitation may cause a reduction in toughness, which has to be avoided.

The microstructure of the steel sheet according to the invention comprises at least 0.1% of kappa carbides, optionally up to 10% of granular ferrite, the remainder being made of austenite.

The austenitic matrix presents an average grain size below 6 μm and preferably below 4 μm, more preferably below 3 μm and has an average aspect ratio between 1.5 and 6, preferably between 2.0 and 4.0 and more preferably between 2.0 and 3.0.

The kappa carbide $(Fe,Mn)_3AlC_x$ are present in the microstructure of the steel sheet according to the invention, with a minimum amount of 0.1% in volume fraction, preferably of 0.5%, more preferably of 1.0% and advantageously of more than 3%. At least 80% of such K-carbides have an average size below 30 nm, preferably below 20 nm, more preferably below 15 nm, advantageously below 10 nm or even below 5 nm. They precipitate inside the austenitic grains (so called intragranular kappa carbides). The homogenous and coherent precipitation of the nanosized-kappa carbide increases the strength of the alloy. The presence of intergranular kappa carbides is not admitted as such intergranular coarse kappa carbides may cause a decrease in the ductility of the steel.

Ferrite can also be present in the microstructure of the sheet according to the invention up to an amount of 10.0% in area fraction, preferably up to 5.0% or more preferably up to 3.0%. However, the ferrite morphology is limited to a granular geometry, excluding ferrite in form of bands, as they drastically degrade the ductility and formability of the steel. When present, the ferritic grains have an average grain size below 5 μm and preferably below 1 μm. The average aspect ratio of the ferrite, when present, is below 3.0 and preferably below 2.5. Such ferrite can be under the form of regular disorded ferrite α or ordered as a B2 structure with a (Fe,Mn)Al composition or as a $DO_3$ structure with a $(Fe,Mn)_3Al$ composition is also possible, so that α, B2 and $DO_3$ structures can be observed in the steel according to embodiments of the present invention.

To protect the steel sheet according to the invention from corrosion, in a preferred embodiment, the steel sheet is covered by a metallic coating. The metallic coating can be an aluminum-based coating or a zinc-based coating.

Preferably, the aluminium-based coated comprises less than 15% Si, less than 5.0% Fe, optionally 0.1 to 8.0% Mg and optionally 0.1 to 30.0% Zn, the remainder being Al.

Advantageously, the zinc-based coating comprises 0.01-8.0% Al, optionally 0.2-8.0% Mg, the remainder being Zn.

The steel sheet according to embodiments of the present invention can be produced by any appropriate manufacturing method and the man skilled in the art can define one. It is however preferred to use the method according to an embodiment of the present invention, which comprises the following steps:

feeding a slab which composition is according to the invention reheating such slab at a temperature above 1000° C. and hot rolling it with a final rolling temperature of at least 800° C., coiling the hot rolled steel sheet at a temperature below 600° C., cold-rolling such hot rolled steel sheet at a reduction comprised between 30 and 80%, first annealing of such cold rolled sheet by heating it up to an annealing temperature comprised between 700 and 1000° C., holding it at such temperature during less than 5 minutes and cooling it at a rate of at least 30° C./s, second annealing of such annealed sheet by heating it up to an annealing temperature comprised between 400 and 700° C., holding it at such temperature during 1 minute to 150 hours and cooling it at a rate of at least 30° C./s, The steel sheets according to the present invention are preferably produced through a method in which an semi product, such as slabs, thin slabs, or strip made of a steel according to the present invention having the composition described above, is cast, the cast input stock is heated to a temperature above 1000° C., preferably above 1050° C. and more preferably above 1100° C. or 1150° C. or used directly at such a temperature after casting, without intermediate cooling.

The hot-rolling step is performed such that the final rolling temperature is above 800° C. To avoid any cracking problem through lack of ductility by the formation of ferrite in bands, the final rolling temperature is preferably above or equal to 850° C.

After the hot-rolling, the strip has to be coiled at a temperature below 600° C. and preferably above 350° C. In a preferred embodiment, the coiling is performed between 350 and 450° C. to avoid excessive kappa carbide precipitation.

The hot-rolled product obtained by the process described above is cold-rolled after a possible prior pickling operation has been performed in the usual manner.

The cold-rolling step is performed with a reduction rate between 30 and 80%, preferably between 50 and 70%.

After this rolling step, a short annealing is performed by heating the sheet up to an annealing temperature comprised between 700 and 1000° C., holding it at such temperature during less than 5 minutes and cooling it at a rate of at least 30° C./s, more preferably of at least 50° C./s and even more preferably of at least 70° C./s. Preferably, this annealing is carried out continuously. By controlling annealing temperature and time, either a fully austenitic or a two phase structure with the characteristics above can be obtained.

After this annealing step, a second annealing is performed by heating the sheet up to an annealing temperature comprised between 400 and 700° C., holding it at such temperature during 1 minute to 150 hours and cooling it at a rate of at least 30° C./s more preferably of at least 50° C./s and even more preferably of at least 70° C./s. Preferably, this annealing is carried out continuously.

After those two annealing steps, the steel sheet may optionally be submitted to a metallic coating operation to improve its protection against corrosion. The coating process used can be any process adapted to the steel of the invention. Electrolytic or physical vapor deposition can be cited, with a particular emphasis on Jet Vapor Deposition. The metallic coating can be based on zinc or on aluminium, for example.

EXAMPLES

Six grades, which compositions are gathered in table 1, were cast in slabs and processed following the process parameters gathered in table 2.

TABLE 1

| | | | | Compositions | | | | |
|---|---|---|---|---|---|---|---|---|
| Grade | C | Mn | Al | Si | S | P | N | V |
| A | 0.887 | 24.90 | 8.70 | 0.217 | 0.004 | 0.025 | 0.0017 | — |
| B | 0.920 | 28.88 | 9.37 | 0.035 | 0.007 | 0.011 | 0.0009 | — |
| C | 0.955 | 19.90 | 5.72 | 0.050 | 0.005 | 0.007 | 0.0068 | — |
| D | 0.920 | 19.00 | 8.70 | 0.050 | 0.003 | 0.009 | 0.006 | — |
| E | 0.910 | 19.72 | 8.36 | 0.045 | 0.010 | 0.010 | 0.005 | 0.28 |
| F | 1.130 | 26.75 | 9.95 | 0.031 | 0.010 | 0.01 | 0.004 | — |

TABLE 2

| | | | Process parameters | | | |
|---|---|---|---|---|---|---|
| Trial | Grade | Reheating T (° C.) | Hot rolling finish T (° C.) | Coiling rate (° C./s) | Cooling T (° C.) | Cold rolling reduction (%) |
| 1 | A | 1170 | 890 | 75 | 400 | 58 |
| 2 | A | 1170 | 890 | 75 | 400 | 58 |
| 3 | B | 1170 | 985 | 75 | 400 | 64 |
| 4 | B | 1170 | 985 | 75 | 400 | 64 |
| 5 | C | 1170 | 1000 | 80 | 400 | 58 |
| 6 | C | 1170 | 1000 | 80 | 400 | 58 |
| 7 | C | 1170 | 1000 | 80 | 400 | 58 |
| 8 | C | 1170 | 1000 | 80 | 400 | 58 |
| 9 | D | 1170 | 1000 | 80 | 400 | 58 |
| 10 | E | 1170 | 1000 | 70 | 400 | 60 |
| 11 | F | 1170 | 1000 | 70 | 400 | 60 |

| | First annealing | | | Second annealing | | |
|---|---|---|---|---|---|---|
| Trial | T (° C.) | Holding time (min) | Cooling rate (° C./s) | T (° C.) | Holding time (h) | Cooling rate (° C./s) |
| 1 | 850 | 3 | 80 | 550 | 3 | 80 |
| 2 | 850 | 3 | 80 | 550 | 6 | 80 |
| 3 | 875 | 3 | 80 | 550 | 3 | 80 |
| 4 | 875 | 3 | 80 | 550 | 6 | 80 |
| 5 | 830 | 3 | 80 | 500 | 3 | 80 |
| 6 | 830 | 3 | 80 | 500 | 6 | 80 |
| 7 | 830 | 3 | 355 | 350 | 170 | 355 |
| 8 | 830 | 3 | 355 | 400 | 170 | 355 |
| 9 | 850 | 3 | 355 | 350 | 170 | 355 |
| 10 | 850 | 3 | 55 | 450 | 3 | 355 |
| 11 | 975 | 3 | 55 | 500 | 3 | 355 |

The resulting samples were then analyzed and the corresponding microstructure elements and mechanical properties were respectively gathered in table 3 and 4.

TABLE 3

| | | | | Microstructure | | | | |
|---|---|---|---|---|---|---|---|---|
| Trial | Austenite (%) | Ferrite (%) | Ferrite shape | Kappa carbides (%) | Austenite grain size (μm) | Austenite aspect ratio | Ferrite grain size (μm) | Ferrite aspect ratio |
| 1 | 95 | 5 | granular | Yes | 2.30 | 2.36 | 0.54 | 1.81 |
| 2 | 95 | 5 | granular | Yes | 2.30 | 2.36 | 0.54 | 1.81 |
| 3 | 100 | 0 | — | Yes | 2.38 | 2.60 | — | — |
| 4 | 100 | 0 | — | Yes | 2.38 | 2.60 | — | — |
| 5 | 100 | 0 | — | No | 2.54 | 2.64 | — | — |
| 6 | 100 | 0 | — | No | 2.54 | 2.64 | — | — |
| 7 | 100 | 0 | — | No | 2.20 | 2.40 | — | — |
| 8 | 100 | 0 | — | No | 2.20 | 2.40 | — | — |

TABLE 3-continued

| | | | | | Microstructure | | | | |
|---|---|---|---|---|---|---|---|---|---|
| Trial | Austenite (%) | Ferrite (%) | Ferrite shape | Kappa carbides (%) | Austenite grain size (μm) | Austenite aspect ratio | Ferrite grain size (μm) | Ferrite aspect ratio |
| <u>9</u> | 97.5 | 2.5 | granular | Yes (intergranular) | 2.20 | 1.90 | 0.50 | 1.90 |
| 10 | 92.5 | 7.5 | granular | Yes | 1.70 | 1.80 | 0.40 | 1.80 |
| 11 | 100 | 0 | — | Yes | 2.90 | 2.00 | — | — |

No samples showed any presence of intergranular K carbides nor of β-Mn phase, except sample 9. Kappa carbides amounts of trials 1 to 4 were above 0.1%, whereas they were under 0.1% for trials 5 and 6. More than 80% of the Kappa carbides of trials 1 to 4 had an average grain size below 20 nm.

Figure 1B:
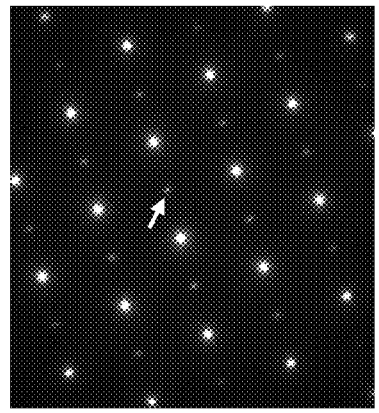

Some microstructure analyses were performed on samples from trial 2 and images of Kappa carbides are reproduced on FIGS. 1 (a) and 1 (b):
(a) Dark field image of kappa carbides
(b) Corresponding diffraction pattern, zone axis [110] kappa. Arrow indicates the reflection used for the dark field image in (a)

TABLE 4

| | Properties | | |
|---|---|---|---|
| Trial | Density | Tensile strength (MPa) | Yield Strength (MPa) |
| 1 | 6.81 | 1233 | 1111 |
| 2 | 6.81 | 1339 | 1224 |
| 3 | 6.75 | 1171 | 1058 |
| 4 | 6.75 | 1206 | 1078 |
| <u>5</u> | <u>7.31</u> | <u>972</u> | <u>604</u> |
| <u>6</u> | <u>7.31</u> | <u>977</u> | <u>616</u> |
| <u>7</u> | <u>7.31</u> | <u>970</u> | <u>617</u> |
| <u>8</u> | <u>7.31</u> | <u>980</u> | <u>630</u> |
| <u>9</u> | 6.80 | 1090 | 850 |
| 10 | 6.86 | 1193 | 1061 |
| 11 | 6.60 | 1019 | 992 |

The examples show that the steel sheets according to the invention are the only one to show all the targeted properties thanks to their specific composition and microstructures.

What is claimed is:

1. A cold rolled and twice annealed steel sheet comprising by weight:
   6<C<1.3%,
   15.0≤Mn <35%,
   6.0≤Al <15%,
   Si ≤2.40%,
   S≤0.015%,
   P≤0.1%,
   N ≤0.1%,
   the remainder of the composition made up of iron and inevitable impurities resulting from elaboration,
   a microstructure of said cold rolled and twice annealed steel sheet consists of at least 0.1% in volume fraction of intragranular kappa carbides, wherein at least 80% of said kappa carbides have an average size below 30 nm, 0 to 10% in area fraction of granular ferrite, and austenite, an average grain size of the austenite being below 6 μm, an average aspect ratio of the austenite being between 1.5 and 6, an average grain size of the granular ferrite, when present being below 5 μm, and an average aspect ratio of the granular ferrite, when present, being below 3.0.

2. The cold rolled and twice annealed steel sheet according to claim 1, further comprising one or more elements chosen among Ni, Cr and Cu in an individual amount of up to 3% by weight and optionally one or more elements chosen among B, Ta, Zr, Nb, V, Ti, Mo, and W in a cumulated amount of up to 2.0% by weight.

3. The cold rolled and twice annealed steel sheet according to claim 1, wherein the carbon content is between 0.8 and 1.0% by weight.

4. The cold rolled and twice annealed steel sheet according to claim 1, wherein the manganese content is between 18 and 30% by weight.

5. The cold rolled and twice annealed steel sheet according to claim 3, wherein the manganese content is between 18 and 30% by weight.

6. The cold rolled and twice annealed steel sheet according to claim 3, wherein the aluminum content is between 8.5 and 10% by weight.

7. The cold rolled and twice annealed steel sheet according to claim 1, wherein the steel sheet is covered by a metallic coating.

8. The cold rolled and twice annealed steel sheet according to claim 1, wherein the steel sheet is covered by an aluminum-based coating or a zinc-based coating.

9. The cold rolled and twice annealed steel sheet according to claim 1, wherein the average grain size of the austenite is below 3 μm.

10. The cold rolled and twice annealed steel sheet according to claim 4, wherein the aluminum content is between 7 and 12% by weight.

11. The cold rolled and twice annealed steel sheet according to claim 10, wherein Si<2.0%,by weight.

12. The cold rolled and twice annealed steel sheet according to claim 1, wherein the density is <7.1 g/cm$^3$.

13. The cold rolled and twice annealed steel sheet according to claim 1, wherein the density is <7 g/cm$^3$.

14. The cold rolled and twice annealed steel sheet according to claim 1, wherein 0.8<C<1.0%, 18<Mn<30%, 8<Al<10%, the average grain size of the austenite is below 3 μm, wherein the steel sheet has an ultimate tensile strength of at least 1000 MPa, a yield strength of at least 900 MPa and a density below 7 g/cm$^3$.

15. A structural or safety part of a vehicle comprising a steel sheet according to claim 1.

16. A structural or safety part of a vehicle obtained by flexible rolling of a steel sheet according to claim 1.

17. A vehicle comprising the structural or safety part of claim 15.

18. A vehicle comprising the structural or safety part of claim 16.

19. A method for producing a steel sheet comprising:
feeding a slab which has a composition, by weight of: 0.6<C<1.3%, 15.0<Mn<35% 6.0<Al<15%, Si<2.40%, S<0.015%, P<0.1%, N<0.1%, the remainder of the composition made up of iron and inevitable impurities resulting from elaboration;
reheating the slab at a temperature above 1000° C. and hot rolling the slab with a final rolling temperature of at least 800° C. to obtain a hot rolled steel sheet,
coiling the hot rolled steel sheet at a temperature below 600° C.,
cold-rolling the hot rolled steel sheet at a reduction comprised between 30 and 80% to obtain a cold rolled sheet,
first annealing of the cold rolled sheet by heating the cold rolled sheet up to a first annealing temperature between 700 and 1000° C., holding the cold rolled sheet at the first annealing temperature for less than 5 minutes and then cooling the cold rolled sheet at a rate of at least 30° C./s to obtain an annealed sheet,
second annealing the annealed sheet by heating the annealed sheet up to a second annealing temperature between 400 and 700° C., holding the annealed sheet at the second annealing temperature for 1 minute to 150 hours and then cooling the annealed sheet at a rate of at least 30° C./s to obtain the cold rolled and twice annealed steel sheet according to claim 1.

20. A method according to claim 19, wherein the composition further includes one or more elements chosen among Ni, Cr and Cu in an individual amount of up to 3% by weight and optionally one or more elements chosen among B, Ta, Zr, Nb, V, Ti, Mo, and W in a cumulated amount of up to 2.0% by weight.

21. A method according to claim 19, wherein the first annealing temperature is between 800 and 950° C.

22. A method according to claim 19, wherein the coiling temperature is between 350 and 500° C.

23. A method according to claim 21, wherein the holding time of the second annealing is between 2 and 10 hours.

24. A method according to claim 22, wherein the holding time of the second annealing is between 2 and 10 hours.

25. A method according to claim 19, further comprising a final coating step.

\* \* \* \* \*